US012636794B2

(12) United States Patent (10) Patent No.: US 12,636,794 B2

Provost et al. (45) Date of Patent: May 26, 2026

(54) METHOD AND SYSTEM FOR CONTROLLING THE APPLICATION OF A PATCH

(71) Applicant: SAFRAN NACELLES, Gonfreville-l'orcher (FR)

(72) Inventors: Benjamin Provost, Moissy Cramayel (FR); Clément Rolland, Moissy Cramayel (FR); Maxime Lebegue, Moissy Cramayel (FR); Renaud Venture, Moissy Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 60 days.

(21) Appl. No.: 18/692,148

(22) PCT Filed: Sep. 16, 2022

(86) PCT No.: PCT/FR2022/051746

§ 371 (c)(1),
(2) Date: Mar. 14, 2024

(87) PCT Pub. No.: WO2023/041879

PCT Pub. Date: Mar. 23, 2023

(65) Prior Publication Data

US 2024/0253238 A1      Aug. 1, 2024

(30) Foreign Application Priority Data

Sep. 17, 2021    (FR) ........................................ 2109812

(51) Int. Cl.
B25J 9/16          (2006.01)
B25J 11/00        (2006.01)

(52) U.S. Cl.
CPC ........... *B25J 9/1697* (2013.01); *B25J 9/1653* (2013.01); *B25J 9/1674* (2013.01); *B25J 11/005* (2013.01)

(58) Field of Classification Search
CPC ...... B25J 9/1697; B25J 9/1653; B25J 9/1674; B25J 11/005; G01N 2021/8472; G01N 2021/8864; B29C 70/38
See application file for complete search history.

(56) References Cited

U.S. PATENT DOCUMENTS 10,926,416 B2 *   2/2021   Soltani Bozchalooi ....................
                                                          G06V 10/82
2013/0228285 A1 *  9/2013   Pause .................... B29C 70/388
                                                                   156/64

(Continued)

FOREIGN PATENT DOCUMENTS

EP          3432266  A1      1/2019
EP          3432266  B1 *  11/2022   ......... G01N 21/8851

OTHER PUBLICATIONS

Machine translation of EP3432266B1 (Year: 2020).*

(Continued)

*Primary Examiner* — Robert T Nguyen
(74) *Attorney, Agent, or Firm* — Kilpatrick Townsend & Stockton LLP

(57) ABSTRACT

A method for controlling the application of a patch can include the following steps:
   positioning a patch on a surface to be covered by means of a gripper and with or without partial overlapping with adjacent patches;
   acquiring by means of an optical control means at least one image of the positioned patch;
   detecting defects in the positioning of the patch by identifying differences in the thickness of the patch on (Continued)

the surface to be covered based on the at least one image of the positioned patch; and mapping the defects in the positioning of the patch.

10 Claims, 4 Drawing Sheets

(56)                References Cited

U.S. PATENT DOCUMENTS

| | | | |
|---|---|---|---|
| 2016/0325509 | A1 | 11/2016 | Prebil et al. |
| 2022/0101506 | A1* | 3/2022 | Jiang .................. G01N 21/9501 |
| 2022/0134691 | A1* | 5/2022 | Ridgeway ............... G06F 30/20 |
| | | | 156/1 |
| 2022/0242103 | A1* | 8/2022 | Muilwijk .................. B32B 5/26 |
| 2023/0341342 | A1* | 10/2023 | Tyson, II ............... G01N 25/72 |
| 2025/0078248 | A1* | 3/2025 | Seneviratne ........... G06V 10/25 |

OTHER PUBLICATIONS

International Patent Application No. PCT/FR2022/051746, International Search Report and Written Opinion dated Dec. 20, 2022, 11 pages (9 pages of original document and 2 pages of English translation).

* cited by examiner

[Fig. 1]
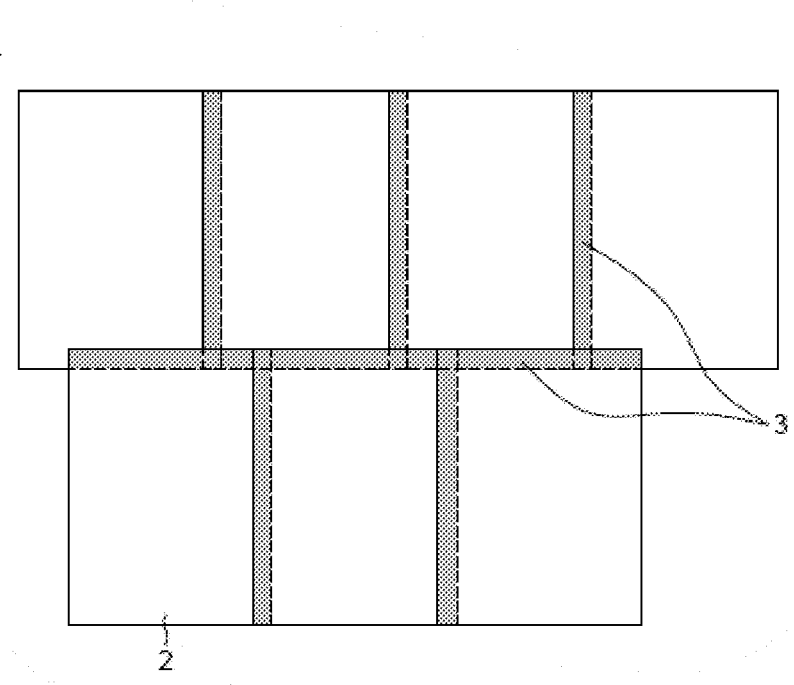
[Fig. 2]
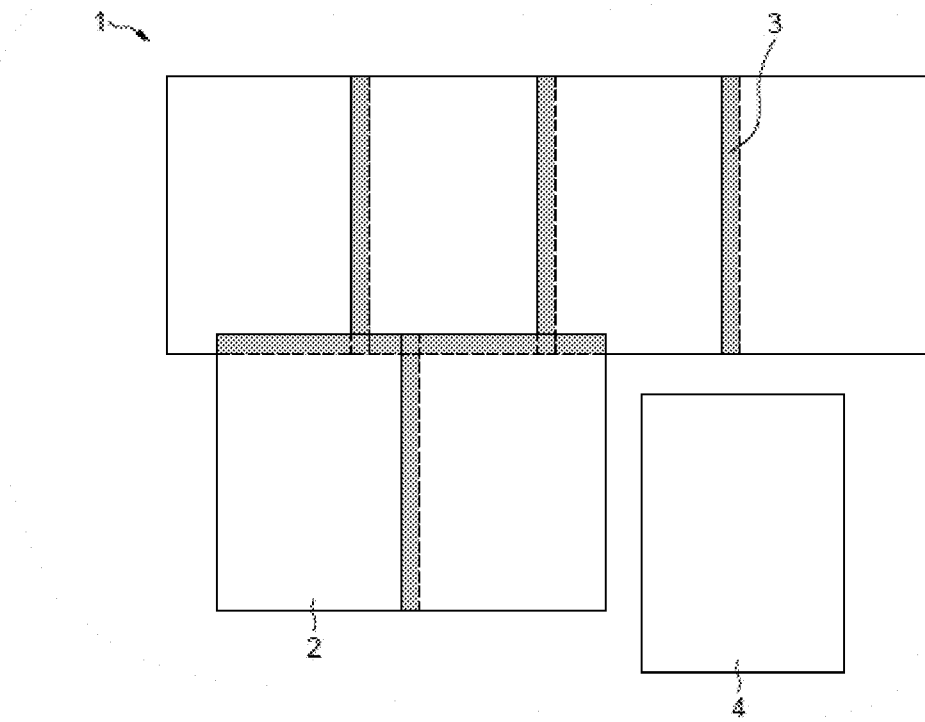

[Fig. 3]
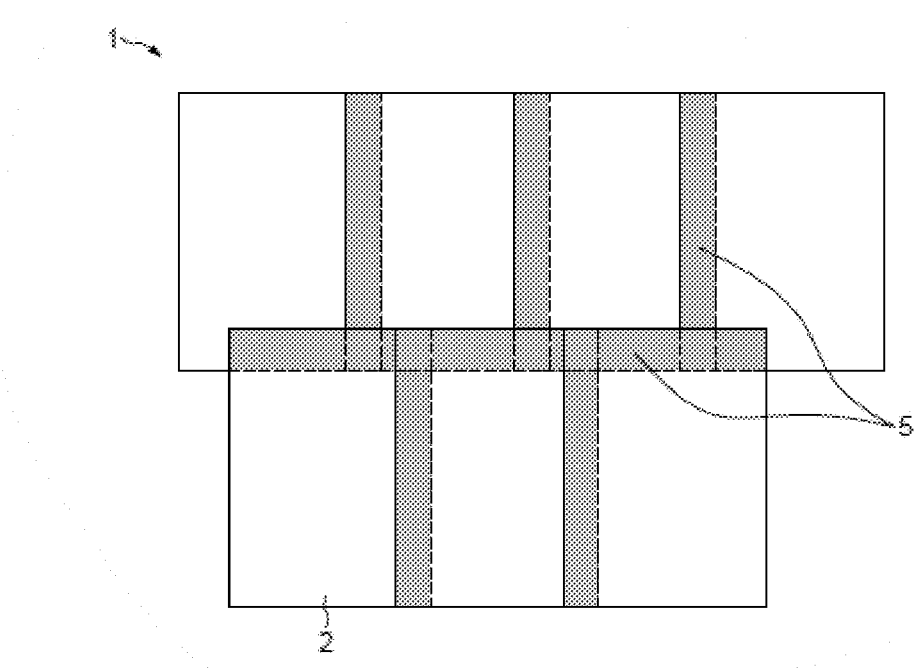
[Fig. 4]
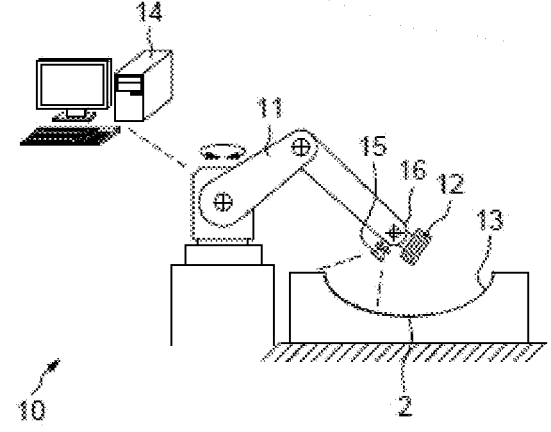

[Fig. 5]
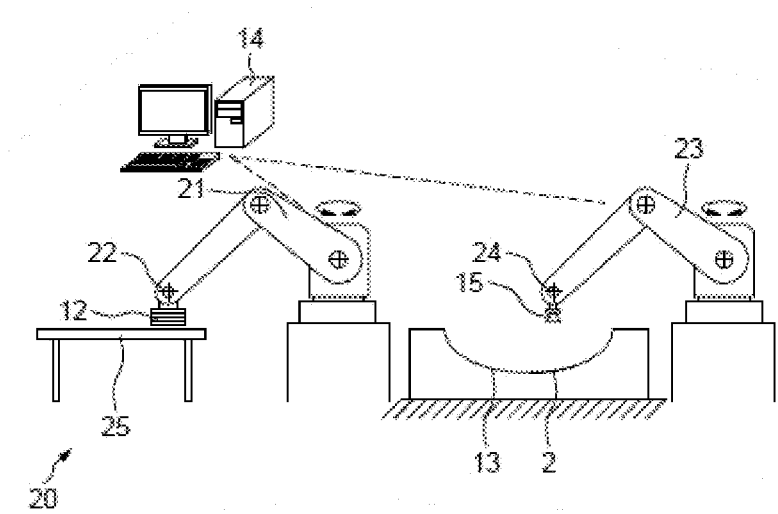
[Fig. 6]
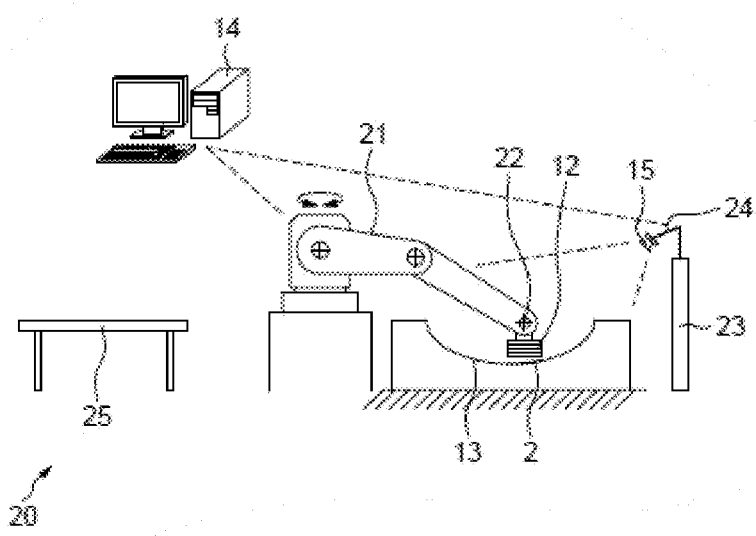

[Fig. 7]
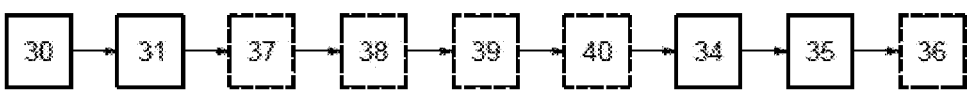
[Fig. 8]
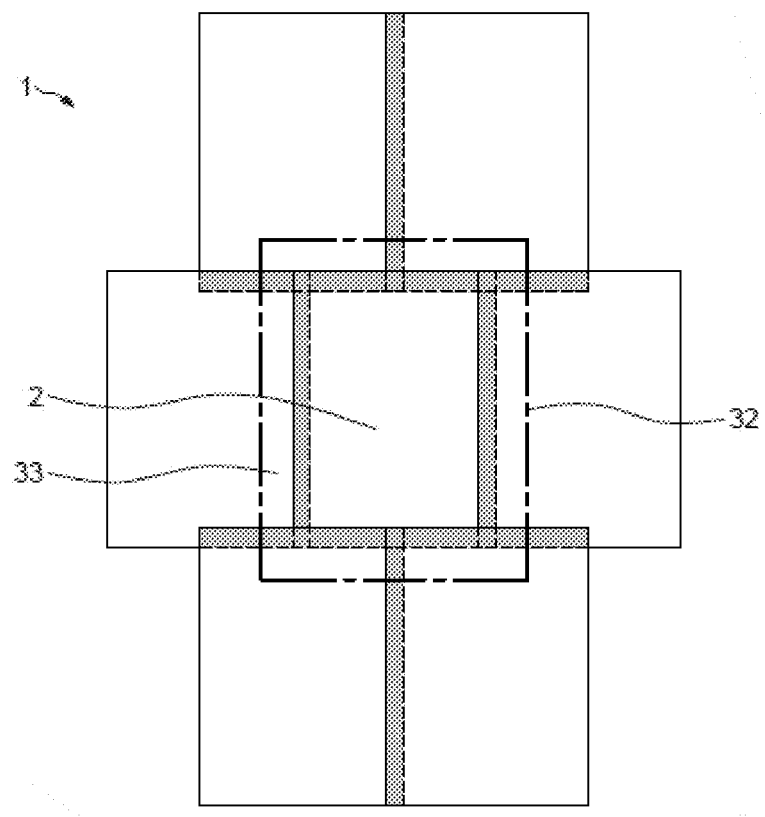
[Fig. 9]
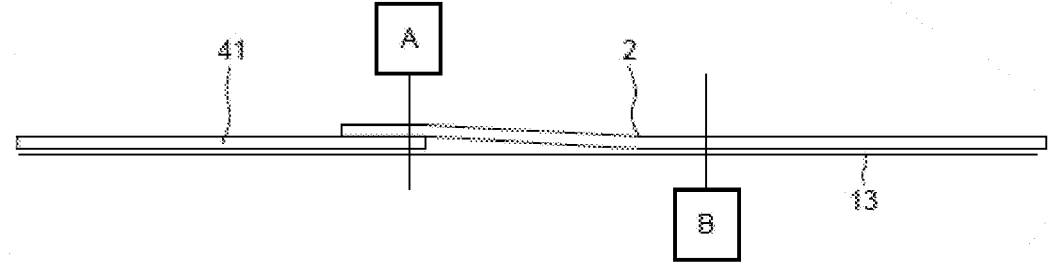

METHOD AND SYSTEM FOR CONTROLLING THE APPLICATION OF A PATCH

TECHNICAL FIELD

The present invention relates to the manufacturing of composite parts and, in particular, the deposition of patches made of pre-impregnated material or adhesives on a part during manufacturing.

More particularly, the present invention relates to systems and methods for controlling the application of a patch grasped and applied by a gripper. A patch has the form of a thin material the sticky character of which may be activated by heat so that the patch adheres to the target part correctly.

PRIOR ART

The positioning of the patch on large surfaces is generally performed using a gripper for grasping then depositing a patch at the desired location on the surface of the target part to be covered. Current solutions implement for example pneumatic, electrostatic, or also mechanical grippers.

In the case of a pneumatic gripper, the gripper grasps the patch by suction by creating a negative pressure that makes it possible for the patch to press against the gripper until the gripper is positioned opposite the part on which the patch must be positioned. The patch is then pressed and slightly compacted against the part, the negative pressure is stopped and the gripper withdraws, leaving the patch on the target surface to be covered. The patch is for example an adhesive.

In order to increase the sticky and tacky character of a patch, to facilitate its adherence to the target part, it is useful to expose it to a heat source.

A patch is for example rectangular and a plurality of patches are positioned side by side in order to cover the surface to be covered. In particular, it is preferable not to leave any bare portion of the surface to be covered. Thus, the patches are placed side by side with a slight overlap with one another, so that the surface to be covered is completely covered and there is no discontinuity between the patches. The overlap represents for example a tenth of one side of a patch. FIG. 1 shows a schematic assembly 1 of patches 2 disposed with an ideal overlap 3.

However, once a patch 2 has been positioned on the surface to be covered, no control is carried out, apart from that of an operator at the end of the covering. Thus, errors in the application of a patch may be detrimental to the precise positioning of a patch and expose the surface to be covered in places. In addition, the positioning may be carried out poorly, the patch may be poorly glued and poorly pressed against the surface to be covered. A space of the wrong size may appear between two patches.

FIG. 2 shows a schematic assembly 1 of patches 2 on a surface to be covered and of which the last positioned patch 4 does not respect the desired overlapping conditions. The surface to be covered therefore is not compliant and is not usable.

In addition, depending on the precision of all of the systems and elements involved in the method for applying the patch, it is necessary to ensure a significant overlap between the various patches in order to prevent all imprecisions of the patch deposition system. FIG. 3 shows a significant overlap 5 between various patches 2 of a schematic assembly 1 of patches. The significant overlap 5 generates an extra cost as well as an extra weight of the final part and therefore is not optimal.

DISCLOSURE OF THE INVENTION

Therefore, the aim of the present invention is to mitigate the aforementioned drawbacks and ensure the conformity of each positioning of the patch automatically.

The object of the present invention is an automatic method for controlling the application of a patch comprising the following steps:

positioning a patch on a surface to be covered by means of a gripper and with or without partial overlapping with adjacent patches;

acquiring by means of an optical control means at least one image of the positioned patch;

detecting defects in the positioning of the patch by identifying differences in the thickness of the patch on the surface to be covered based on the at least one image of the positioned patch;

mapping the defects in the positioning of the patch.

Thus, positioning and controlling the correct application of a patch does not require human intervention and the automatic mapping makes it possible to allow the possibility of analyzing the occurrences of defects in the application of patches and thus of taking corrective actions to prevent future defects. The control method makes it possible to identify any type of non-conformity, such as an incorrect gluing or pressing of the patch on the surface to be covered, or an incorrect positioning, or also a space of the wrong size between two patches.

Advantageously, the step of acquiring at least one image of the positioned patch is carried out with an optical control means having a field angle wider than the field angle required for the imaging of the patch alone, or producing an image with a field angle wider than the field angle required for the imaging of the patch alone by scanning.

In one implementation, the method further comprises a step of transmitting and alerting of defects to an operator or to a correction automaton after the step of mapping the defects.

In a particular implementation, the method further comprises the following steps:

acquiring at least two images with a different image capture direction during the step of acquiring at least one image of the positioned patch;

reconstructing the imaged patch and its periphery as a three-dimensional point cloud based on the at least two images of the positioned patch obtained at the acquisition step, the reconstruction step being carried out before the step of detecting defects in the positioning of the patch;

finding the edges of the imaged patch in the three-dimensional point cloud reconstruction, the step of finding the edges being carried out before the step of detecting defects in the positioning of the patch;

extracting two-dimensional sectional profiles of the edges of the imaged patch, the step of extracting the profiles being carried out before the step of detecting defects in the positioning of the patch;

smoothing the two-dimensional sectional profiles and iteratively analyzing the slope of these profiles so as to create data on the thickness of the patch on the surface to be covered, this smoothing step being carried out before the step of detecting defects in the positioning of the patch.

Advantageously, the step of detecting defects in the positioning of the patch by identifying differences in the thickness of the patch on the surface to be covered comprises analyzing by matching the shades of gray of the at least one image of the positioned patch with a patch thickness.

Another object of the present invention is a computer program configured to implement the method such as defined above, when it is executed by the computer.

Furthermore, the object of the present invention is a computer-readable recording medium comprising instructions that, when they are executed by a computer cause it to implement the steps of the method such as defined above.

Another object of the invention is a system for controlling the application of a patch on a surface to be covered comprising a gripper capable of grasping the patch and depositing it on the surface to be covered, a means for optically controlling the conformity of the positioning of a patch on the surface to be covered and a means for implementing the method such as defined above.

In one embodiment, the system comprises an articulated arm and a head carried by the articulated arm, the head comprising the gripper and the optical control means.

In another embodiment, the system comprises a first articulated arm comprising a first head and a second arm carrying a second head, the first and second heads one comprising the gripper and the other the optical control means.

Advantageously, the optical control means is mounted on a post, or at the ceiling, and/or on rails, and/or on a movable structure located above the surface to be covered.

Advantageously, the optical control means is a laser sensor or a white light sensor or a visible camera or a stereoscopic camera or a plenoptic sensor or an infrared camera.

BRIEF DESCRIPTION OF THE DRAWINGS

Other aims, features and advantages of the invention will become apparent upon reading the following description given purely by way of a non-limiting example, and referring to the appended drawings wherein:

FIG. 1 which has already been mentioned, illustrates a schematic assembly of patches disposed with an ideal overlap;

FIG. 2 which has already been mentioned, illustrates a schematic assembly of patches on a surface to be covered of which one of the patches is poorly positioned;

FIG. 3 which has already been mentioned, illustrates a schematic assembly of patches disposed with too much overlap;

FIG. 4 schematically illustrates a first embodiment of a system for controlling the application of a patch according to the invention;

FIG. 5 schematically illustrates a second embodiment of a system for controlling the application of a patch according to the invention;

FIG. 6 schematically illustrates one variant of the second embodiment of a system for controlling the application of a patch according to the invention; and FIG. 7 illustrates the various steps of the method for controlling the application of a patch according to the invention;

FIG. 8 schematically illustrates an assembly of patches as well as an inspection zone around a patch; and

FIG. 9 illustrates an example of a smoothed sectional profile of a patch edge with overlapping.

DETAILED DISCLOSURE OF AT LEAST ONE EMBODIMENT

FIG. 4 shows a schematic view of a system 10 for controlling the application of a patch 2 in a first embodiment.

The system 10 is for example an automaton. It includes a robotized articulated arm 11 carrying a gripper 12 capable of gripping and positioning patches 2 on a target surface to be covered 13. The gripper 12 is for example pneumatic, electrostatic, or also mechanical.

A heating system (not shown) may be located nearby to increase the stickiness and the tacky character of patches.

The system 10 comprises a means for implementing 14 a method for controlling the application of patches 2. The means for implementing 14 the control method is for example a computer. Optionally, it further makes it possible to supervise the operations of gripping, heating, and positioning of patches 2.

The system 10 further comprises a means for optically controlling 15 the conformity of the positioning of a patch 2 on the surface to be covered 13. The optical control means 15 is for example a laser sensor, a laser rangefinder, or a white light sensor of the confocal type, or a visible camera, or a stereoscopic camera with or without pattern projection, or a plenoptic sensor, or an infrared camera. Optionally, the optical control means comprises a scanning imaging means.

In this first embodiment, the optical control means 15 is carried by the robotized arm 11. In particular, the arm comprises a tiltable head 16 carrying the gripper 12 and the optical control means 15. Once the gripper 12 has grasped and positioned a patch 2 on the surface to be covered 13, the head 16 tilts or pivots and enables the optical control means 15 to acquire at least one image in the aim of controlling the conformity of the positioning of the patch 2.

In a second embodiment illustrated in FIG. 5, the system 20 for controlling the application of a patch 2 comprises a first robotized articulated arm 21 comprising a first head 22, as well as a second robotized articulated arm 23 carrying a second head 24.

The system 20 also comprises a means for implementing 14 a method for controlling the application of patches 2. The means for implementing 14 the control method is for example a computer. Optionally, it further makes it possible to supervise the operations of gripping, heating, and positioning of patches 2.

The first head 22 comprises a gripper 12 capable of grasping the patch 2 on a work bench 25 and of depositing said patch 2 on a surface to be covered 13. The gripper 12 is for example pneumatic, electrostatic, or also mechanical.

The second head 24 comprises a means for optically controlling 15 the conformity of the positioning of a patch 2 on the surface to be covered 13. The optical control means 15 is for example a laser sensor, a laser rangefinder, or a white light sensor of the confocal type, or a visible camera, or a stereoscopic camera with or without pattern projection, or a plenoptic sensor, or an infrared camera. Optionally, the optical control means 15 comprises a scanning imaging means.

The means for implementing 14 the control method synchronizes for example the two arms 21 and 23 so that the second arm 23 carrying the second head 24 controls the positioning of the patch 2 using the optical control means 15 while the first arm 21, by means of the gripper 12, grasps a new patch 2 on the work bench 25.

In one variant of the second embodiment illustrated in FIG. 6, the second arm 23 is neither articulated nor robotized. The second arm 23 is fixed and comprises a second head 24 comprising a means for optically controlling 15 the conformity of the positioning of a patch 2 on the surface to be covered 13. In particular, the optical control means 15 has a field angle that may image the entire surface to be covered 13. Alternatively, the optical control means 15 has a reduced field angle and the second head 24 is tiltable so that the entire surface to be covered 13 can be imaged by the optical control means 15.

In each embodiment, the system 10 or 20 optionally comprises an automaton for correcting defects (not shown) in order to reposition the patch 2 for which a positioning defect is detected.

In addition, in each embodiment, the system 10 or 20 optionally comprises one or more other optical control means 15 in order to be able to image the patch 2 to be controlled in a plurality of different image capture directions.

FIG. 7 shows the various steps of the method for controlling the application of a patch 2 implemented with the optical control means 15. This method is conducted for each patch 2 applied on the surface to be covered 13.

The aim of this method is to detect and to map defects in the positioning of patches 2. In particular, the defects that may be detected are an incorrect positioning of the patch 2, an incorrect orientation of the patch 2, the absence of overlapping between a patch and an adjacent patch, the incorrect adhesion of a patch to the surface to be covered 13, the folding of the patch 2 on itself, or also the absence of patch on a zone of the surface to be covered 13. In particular, the defects detected have a size between 0.1 millimeter and 10 centimeters. The technology of the optical control means 15 must make it possible to achieve such a precision.

In a first step 30 of the method, a patch 2 is positioned on a surface to be covered 13 by means of the gripper 12 and with partial overlapping with adjacent patches. The positioning of the patch 2 may also be carried out without overlapping with adjacent patches.

Then, a step 31 of acquiring at least one image of the positioned patch 2 using the optical control means 15 is carried out. The acquisition is carried out for example with an optical control means 15 having a large field angle and imaging the positioned patch 2 as well as its periphery in order to ensure overlapping with the adjacent patches. Alternatively, the acquisition is carried out with an optical control means 15 having a small field angle. It is then necessary to scan the patch 2 and the periphery of the patch to be imaged and to reconstitute a large field image based on the small field images. In each alternative, at least one total image of the patch 2 and of its periphery corresponding to an inspection zone is obtained.

The periphery of the patch is defined here as the space close to the edges of the patch 2. The width of the periphery corresponds for example to the width up to five times equal to the tolerance width, the tolerance width being for example the maximum tolerated overlapping width beyond which the overlap is estimated as being too wide. This periphery width also makes it possible not to image the edges of patches located further away. FIG. 8 shows a patch 2 assembly 1 as well as an inspection zone 32 corresponding to the image of the patch 2 and of its periphery 33.

Subsequently, the means for implementing the method carries out a step 34 of detecting defects in the positioning of the patch 2 by identifying differences in the thickness of the patch 2 on the surface to be covered 13. The detection of defects is carried out based on the at least one image obtained at the preceding acquisition step 31.

Indeed, during an overlapping, a folding, or an absence of overlapping, the thickness of the patch 2 layer on the surface to be covered 13 varies, and it is possible to identify the thickness defects via a two-dimensional colorimetric method and/or via a three-dimensional measurement method.

Once the defects have been detected, a step 35 of mapping the defects in the positioning of the patch 2 is carried out in order to be able to correct the defects and/or put in place a corrective action aiming to no longer reproduce the defect in the future.

In particular, optionally a step 36 of transmitting and alerting the presence of defects to an operator or to the defect correction automaton is carried out.

In another implementation, the step 34 of detecting defects in the positioning of the patch by identifying differences in the thickness of the patch 2 on the surface to be covered 13 is carried out by a colorimetric method and comprises analyzing the shades of gray of the image obtained at the end of the acquisition step 31. This implementation is only possible for a translucent patch material in the visible spectrum or at the observation wavelength of the camera, for example translucent in the infrared spectrum. The overlapping or the absence of overlapping gives a different tint to the patch, generally darker in the overlapping zones. An analysis by matching the shades of gray with a given thickness of the patch 2 therefore makes it possible to detect the defects in the positioning of the patch 2.

In another implementation, compatible with the preceding implementation, the step 34 of detecting defects in the positioning of the patch 2 by identifying differences in the thickness of the patch on the surface to be covered is carried out by a three-dimensional measurement method. This implementation is particularly advantageous when the material of the patch is opaque and where the shades of gray analysis method is not applicable. This implementation requires additional steps before the step 34 of mapping the defects.

In this implementation, at least two images are acquired with a different image capture direction during the acquisition step 31. The positions of the optical control means 15 are nevertheless known during at least two image captures. This makes it possible to be able to reconstitute by triangulation the inspection zone 32 in three dimensions.

Thus, a step 37 of reconstructing the imaged patch 2 and its periphery 33, zone also called inspection zone 32, as a three-dimensional point cloud based on the acquired images, is subsequently carried out. An optical control means 15 particularly adapted to acquire images for this implementation is a stereoscopic camera. In the case of acquiring images by stereoscopy, a dataset is obtained comprising at least two left and right images of the same scene. The reconstruction step 37 is performed using three-dimensional reconstruction algorithms based on images. The point cloud constitutes a mapping of the inspection zone and consists of a list of coordinates (X, Y, Z). The resolution of the point cloud must be as a minimum the value of the tolerance width divided by twenty. This will make it possible to have a sufficient point density in the inspection zone 32.

Then, a step 38 of finding the edges of the patch 2 is carried out in the point cloud reconstruction. The edge finding step 38 is carried out with corner detection algorithms or segmentation algorithms that make it possible to define sets of points in the point cloud.

As the edges of the patch 2 are identified, a step 39 of extracting sectional profiles of the edges of the imaged patch 2 is carried out. For example, three sectional profiles are regularly produced for each side of the patch, in order to be able to detect defects in various zones of each side of the patch 2.

The profiles are subsequently smoothed in a step 40 in order to transform the point profile into a usable curve for a slope analysis. One example of a smoothed profile of a patch edge with overlapping is illustrated in FIG. 9. In FIG. 9, the point A corresponds to the portion of the patch 2 overlapping an adjacent patch 41 whereas the point B corresponds to the portion of the patch overlapping the surface to be covered 13.

Thus, an iterative analysis of the slope of these profiles is carried out so as to create data on the thickness of the patch 2 on the surface to be covered 13. The analysis of the slope is carried out for example by producing the derivative of the curve of the smoothed profiles. If the derivative is greater than a predefined threshold, it is considered that there is a change in thickness and a thickness is attributed to the zone concerned.

This analysis by using the derivative and attributing a thickness data to a zone therefore makes it possible to detect defects in the positioning of the patch during the step 34 of detecting defects. Indeed, according to the values of the derivative, an overlapping or an absence of overlapping are identified. The overlapping is characterized for example by a positive then negative variation of the profile. An absence of overlapping conversely produces a negative then positive variation of the profile.

This implementation is finally followed by the step 35 of mapping the defects.

The invention claimed is:

1. A method for controlling application of a patch, the method comprising:

positioning a patch on a surface to be covered by means of a gripper and with or without partial overlapping with adjacent patches;

acquiring by means of an optical control means at least one image of the positioned patch;

detecting defects in the positioning of the patch by identifying differences in thickness of the patch on the surface to be covered based on the at least one image of the positioned patch; and mapping the defects in the positioning of the patch.

2. Method according to claim 1, wherein acquiring at least one image of the positioned patch is carried out with an optical control means having a field angle wider than a field angle required for imaging the patch alone, or producing an image with a field angle wider than a field angle required for imaging the patch alone by scanning.

3. Method according to claim 1, further comprising transmitting and alerting of defects to an operator or to a correction automaton after mapping the defects.

4. Method according to claim 1, further comprising the following steps:

acquiring at least two images with a different image capture direction during acquiring at least one image of the positioned patch;

reconstructing the imaged patch and its periphery as a three-dimensional point cloud based on the at least two images of the positioned patch obtained via acquiring by means of the optical control means, the reconstruction being carried out before detecting defects in the positioning of the patch;

finding edges of the imaged patch in a three-dimensional point cloud reconstruction, finding the edges being carried out before detecting defects in the positioning of the patch;

extracting two-dimensional sectional profiles of the edges of the imaged patch, extracting the profiles being carried out before detecting defects in the positioning of the patch; and smoothing the two-dimensional sectional profiles and iteratively analyzing a slope of the two-dimensional sectional profiles to create data on the thickness of the patch on the surface to be covered, the smoothing being carried out before detecting defects in the positioning of the patch.

5. Method according to claim 1, wherein detecting defects in the positioning of the patch by identifying differences in the thickness of the patch on the surface to be covered comprises analyzing by matching shades of gray of the at least one image of the positioned patch with a patch thickness.

6. System for controlling application of a patch on a surface to be covered, the system comprising a gripper capable of grasping the patch and depositing the patch on the surface to be covered, wherein the system comprises a means for optically controlling conformity of the positioning of a patch on the surface to be covered and a means for implementing the method according to claim 1.

7. System according to claim 6, further comprising an articulated arm and a head carried by the articulated arm, the head comprising the gripper and the optical control means.

8. System according to claim 6, further comprising a first articulated arm comprising a first head and a second arm carrying a second head, of the first and second heads one comprising the gripper and the other comprising the optical control means.

9. System according to claim 6, wherein the optical control means is mounted on a post, or at a ceiling, and/or on rails, and/or on a movable structure located above the surface to be covered.

10. System according to claim 6, wherein the optical control means is a laser sensor or a white light sensor or a visible camera or a stereoscopic camera or a plenoptic sensor or an infrared camera.

\* \* \* \* \*